(12) United States Patent
Chung et al.

(10) Patent No.: US 8,014,032 B2
(45) Date of Patent: Sep. 6, 2011

(54) ELECTROPHOTOGRAPHIC IMAGE FORMING APPARATUS AND HALFTONING CORRECTION METHOD THEREOF

(75) Inventors: Woo-jun Chung, Suwon-si (KR); Sang-ho Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 934 days.

(21) Appl. No.: 11/685,883

(22) Filed: Mar. 14, 2007

(65) Prior Publication Data
US 2008/0055650 A1    Mar. 6, 2008

(30) Foreign Application Priority Data
Sep. 1, 2006    (KR) ................ 10-2006-0084422

(51) Int. Cl.
*H04N 1/405*    (2006.01)
(52) U.S. Cl. ................... 358/3.06; 358/1.15
(58) Field of Classification Search ............ 358/1.9, 358/2.1, 3.06–3.09, 1.15; 382/237
See application file for complete search history.

(56) References Cited

U.S. PATENT DOCUMENTS

| | | | | |
|---|---|---|---|---|
| 4,246,614 A | * | 1/1981 | Knox | 358/3.24 |
| 4,259,694 A | * | 3/1981 | Liao | 358/3.07 |
| 4,288,821 A | * | 9/1981 | Lavallee et al. | 358/3.07 |
| 5,697,712 A | | 12/1997 | Sato et al. | |
| 6,707,579 B1 | | 3/2004 | Komiya et al. | |
| 2006/0139696 A1 | | 6/2006 | Yamamoto | |

FOREIGN PATENT DOCUMENTS

EP    0621723    10/1994

OTHER PUBLICATIONS

European Search Report dated Apr. 13, 2010, issued in corresponding European Application No. 07109417.1.

* cited by examiner

*Primary Examiner* — Tommy D Lee
*Assistant Examiner* — Stephen M Brinich
(74) *Attorney, Agent, or Firm* — Staas & Halsey LLP

(57) ABSTRACT

An electrophotographic image forming apparatus and a halftoning correction method thereof are provided. The electrophotographic image forming apparatus according to the example embodiments of the present invention, comprises a storage unit storing a plurality of dot patterns representing print characteristics of a print engine, a data area dividing unit dividing halftoned print data into data areas respectively having the same size as the dot patterns, a pattern extraction unit extracting an appropriate dot pattern with respect to each of the divided data areas by comparing dots in the data areas to the dot patterns, and a pattern converter changing the data area to the extracted dot pattern. Therefore, an optimal halftoned image can be provided.

12 Claims, 4 Drawing Sheets

ELECTROPHOTOGRAPHIC IMAGE FORMING APPARATUS AND HALFTONING CORRECTION METHOD THEREOF

CROSS-REFERENCE TO RELATED APPLICATIONS

This application claims all benefits accruing under 35 U.S.C. §119 from Korean Patent Application No. 2006-84422, filed on Sep. 1, 2006 in the Korean Intellectual Property Office, the entire disclosure of which is incorporated herein by reference.

BACKGROUND OF THE INVENTION

1. Field of the Invention

Aspects of the present invention relate to an electrophotographic image forming apparatus and a halftoning correction method thereof, and more particularly, to an electrophotographic image forming apparatus and a halftoning correction method thereof which compensate for halftoned print data by taking into consideration print characteristics of a print engine.

2. Related Art

Generally, electrophotographic methods have been used in image forming apparatuses, such as laser beam printers, LED print head (LPH) printers, facsimiles, photocopiers, and multi-functional products. Such electrophotographic image forming apparatuses perform printing through the steps of charging, exposure, development, transfer and fusing an image onto a printable medium, such as paper.

Print image quality is one of the main factors used to determine the performance of an electrophotographic image forming apparatus. These factors may be divided into factors relating to the performance of hardware or printable media and factors relating to software.

Examples of factors related to performance of the hardware of the electrophotographic image forming apparatus, such as a print engine, and the performance of printable media, such as paper, include an output resolution, toner properties, ability of print engines to repeat a print position, or the like. The factors related to the performance of the hardware or printable media are intimately interrelated.

Therefore, if the factors relating to hardware or printable media are taken into account when printing, an improved image quality can be achieved in electrophotographic image forming apparatuses. However, no a technique to improve image quality currently takes into account factors related to the performance of the hardware, such as a print engine, or printable media.

SUMMARY OF THE INVENTION

Aspects of the present invention relate to an electrophotographic image forming apparatus and a halftoning correction method thereof, which compensate for halftoned print data using a plurality of dot patterns generated based on print characteristics of a print engine so that an optimal halftoning result is obtained.

Additional aspects and/or advantages of the invention will be set forth in part in the description which follows and, in part, will be obvious from the description, or may be learned by practice of the invention.

According to an aspect of the present invention, there is provided an electrophotographic image forming apparatus comprising a storage unit to store a plurality of dot patterns representing print characteristics of a print engine of the electrophotographic image forming apparatus, a data area dividing unit to divide halftoned print data received or generated by the electrophotographic image forming apparatus into data areas having the same size as the dot patterns, a pattern extraction unit to extract an appropriate dot pattern from the storage unit with respect to each of the data areas by comparing dots in the data areas to the dot patterns, and a pattern converter to change a data area to the dot pattern extracted for the data area.

According to another aspect of the present invention, the pattern extraction unit may extract a dot pattern identical to the data area.

According to another aspect of the present invention, when there is no dot pattern in which the dots are disposed at the same position as in the data area, the pattern extraction unit may extract a dot pattern in which the dots are disposed at a position adjacent to dots in the data area.

According to another aspect of the present invention, the electrophotographic image forming apparatus may further comprise a dot pattern generator to change the position of a predetermined number of dots in a dot pattern of a certain size and to generate a plurality of dot patterns taking into consideration the print characteristics of the print engine.

According to another aspect of the present invention, the dot pattern generator may output a test image, scan the outputted image, and analyze the scanned image to determine the print characteristics of the print engine.

According to another aspect of the present invention, there is provided a halftoning correction method of an electrophotographic image forming apparatus having a plurality of dot patterns representing print characteristics of a print engine of the electrophotgraphic image forming apparatus. The method comprises dividing halftoned print data received or generated by the electrophotographic image forming apparatus into data areas having the same size as the dot patterns, extracting an appropriate dot pattern with respect to each of the data areas by comparing dots in the data areas to the dot patterns, and changing a data area to the dot pattern extracted for the data area.

According to another aspect of the present invention, the extracting the dot pattern may comprise extracting a dot pattern identical to the divided data area.

According to another aspect of the present invention, the extracting the dot pattern may comprise extracting a dot pattern in which the dots are disposed at a position adjacent to dots in the data area, when there is no dot pattern in which the dots are disposed at the same position as in the data area.

According to another aspect of the present invention, the method may further comprise changing the position of a predetermined number of dots in a dot pattern of a certain size to generate a plurality of dot patterns taking into consideration the print characteristics of the print engine.

According to another aspect of the present invention, the generating the dot patterns may comprise outputting a test image, scanning the outputted image, and analyzing the scanned image to determine the print characteristics of the print engine.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
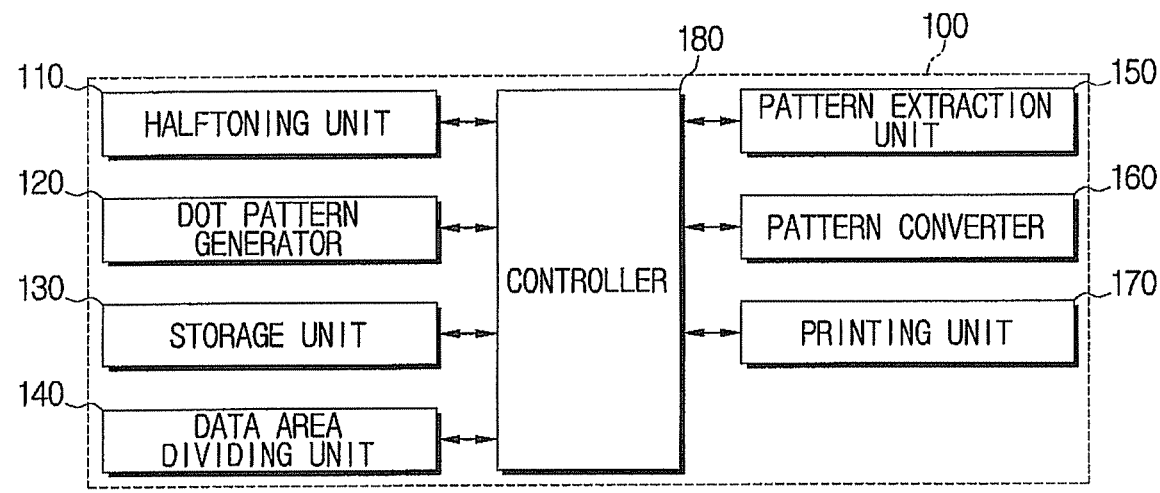
FIG. 1 is a block diagram of an electrophotographic image forming apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an electrophotographic image forming apparatus according to an example embodiment of the present invention. As shown In FIG. 1, an electrophotographic image forming apparatus 100 may comprise a halftoning unit 110, a dot pattern generator 120, a storage unit 130, a data area dividing unit 140, a pattern extraction unit 150, a pattern converter 160, a print engine 170, and a controller 180. Other embodiments may have additional units or may combine the functionality of two or more of the above units into a single unit.

The halftoning unit 110 halftones print data representing an image to be printed on a printable medium. Typically, the halftoning makes it possible to create a monochromatic binary image from an image with multiple brightness levels. Dithering and error diffusion are examples of halftoning techniques.

The dot pattern generator 120 generates a plurality of dot patterns, taking into consideration the print characteristics of a print engine. In this exemplary embodiment, the dot pattern generator 120 changes the position of the dots according to the number of dots capable of being disposed in a dot pattern of a certain size and print characteristics of the print engine (or other hardware.) The dot pattern may have a size of approximately 3×3. Other sized dot patterns may also be utilized.

In the electrophotographic image forming apparatus 100, a modeling technique enables predictions to be made about the value actually outputted and the development. The modeling technique makes it possible to predict problems arising during the printing and to improve performance by analyzing the print characteristics of the print engine and modeling information obtained from the analysis. The modeling technique is known to those skilled in the art, so a more detailed description thereof is omitted. Using this modeling technique, the dot pattern generator 120 generates dot patterns representing the print characteristics of the print engine.

The dot pattern generator 120 allows a preset test image to be outputted through the print engine 170, scans the outputted test image with a scanner (not shown), and analyzes the scanned image. Accordingly, the print characteristics of the print engine can be determined. The dot pattern generator 120 is described in more detail in FIG. 2.

The storage unit 130 stores the plurality of dot patterns generated in the dot pattern generator 120. The storage unit 130 provides the plurality of dot patterns stored in response to requests by the pattern extraction unit 150. Each dot pattern stored in the storage unit 130 may have an index value to permit easy searching.

The data area dividing unit 140 divides the print data halftoned by the halftoning unit 110 into data areas of the same size as the dot patterns. In this example embodiment, the size of the dot pattern is approximately 3×3, so the data area dividing unit 140 divides the print data into data areas with a size of approximately 3×3.

The pattern extraction unit 150 compares dots in the divided data areas to the dot patterns to extract, for each divided data area, the dot pattern most similar to that data area. The pattern extraction unit 150 may extract a dot pattern in which the dots are disposed at the same position as in the data areas among the dot patterns having the same number of dots as in each data area.

However, since the dot patterns are generated in the dot pattern generator 120 based on the print characteristics of the print engine, the dot pattern generator 120 does not generate all possible patterns for a 3×3 area. Accordingly, when the pattern extraction unit 150 cannot extract a dot pattern identical to the data areas, the pattern extraction unit 150 extracts a dot pattern in which the dots are disposed at a position adjacent to dots in the data areas, or the dot pattern most similar to the data area.

The situation in which there is no dot pattern identical to the data area is described as follows. If the data area has, for example, three dots, the pattern extraction unit 150 extracts a corresponding dot pattern with three dots from the dot patterns stored in the storage unit 130. In this situation, among the dot patterns having three dots, one dot pattern may have two dots disposed at the same positions as in the data area and one dot disposed at a position adjacent to the position in the data area.

The pattern converter 160 changes the data area of the print data to the dot pattern extracted by the pattern extraction unit 150. In other words, the pattern converter 160 converts the data areas of the halftoned print data to the corresponding dot patterns extracted by the pattern extraction unit 150, and generates new halftoned print data accordingly.

The print engine 170 prints the print data under the control of the controller 180. In this exemplary embodiment, the print engine 170 prints the new halftoned print data generated by converting the data areas to the dot patterns by the pattern converter 160. In addition, the print engine 170 may print a test image used by the dot pattern generator 120 to generate dot patterns.

The controller 180 controls all the functions of the electrophotographic image forming apparatus 100. In other words, the controller 180 controls input and output of signals to and from the halftoning unit 110, the dot pattern generator 120, the storage unit 130, the data area dividing unit 140, pattern extraction unit 150, pattern converter 160, and print engine 170.

Figure 2:
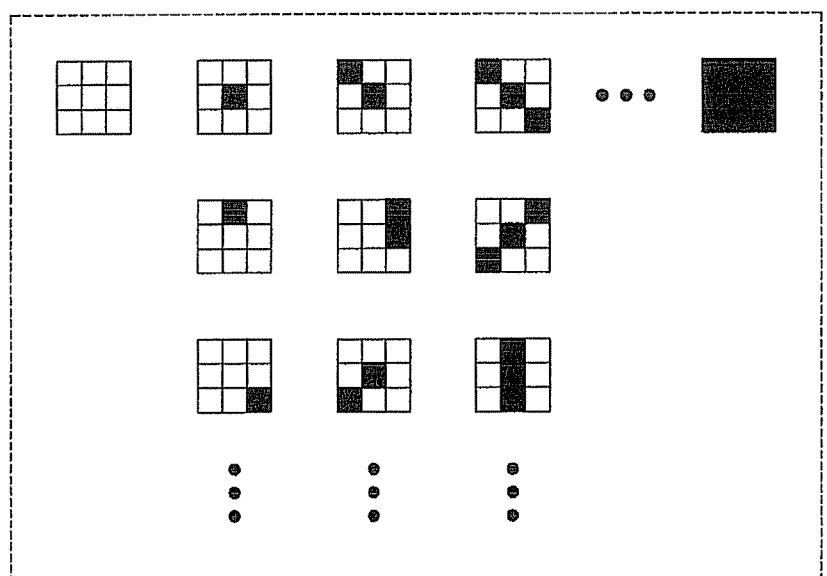
FIG. 2 is a view exemplifying a plurality of dot patterns applied to an example embodiment of the present invention.

FIG. 2 is a view exemplifying a plurality of dot patterns applied to example embodiments of the present invention.

FIG. 2 exemplifies the plurality of dot patterns generated in the dot pattern generator 120. If the size of the dot pattern is 3×3, as shown in FIG. 2, up to nine dots can be disposed in one dot pattern.

If zero or nine dots are disposed in one dot pattern, the dot pattern may have only one form. However, if 1 to 8 dots are disposed in one dot pattern, the dot pattern may have various forms according to the position at which the dots are disposed. For example, when one dot is disposed in one dot pattern, the dot pattern may have nine forms. However, if a particular dot pattern has an inappropriate form, considering the print characteristics of the print engine, the dot pattern generator 120 may not generate that particular dot pattern.

In other words, taking into consideration the print characteristics of the print engine, the dot pattern generator 120 changes the position of the corresponding number of the dots according to the number of the dots capable of being disposed in the dot pattern of a predetermined size, such as 3×3, to generate a plurality of dot patterns. For 3'33 dot patterns, the pattern generator 120 may generate up to 512 dot patterns.

Figure 3:
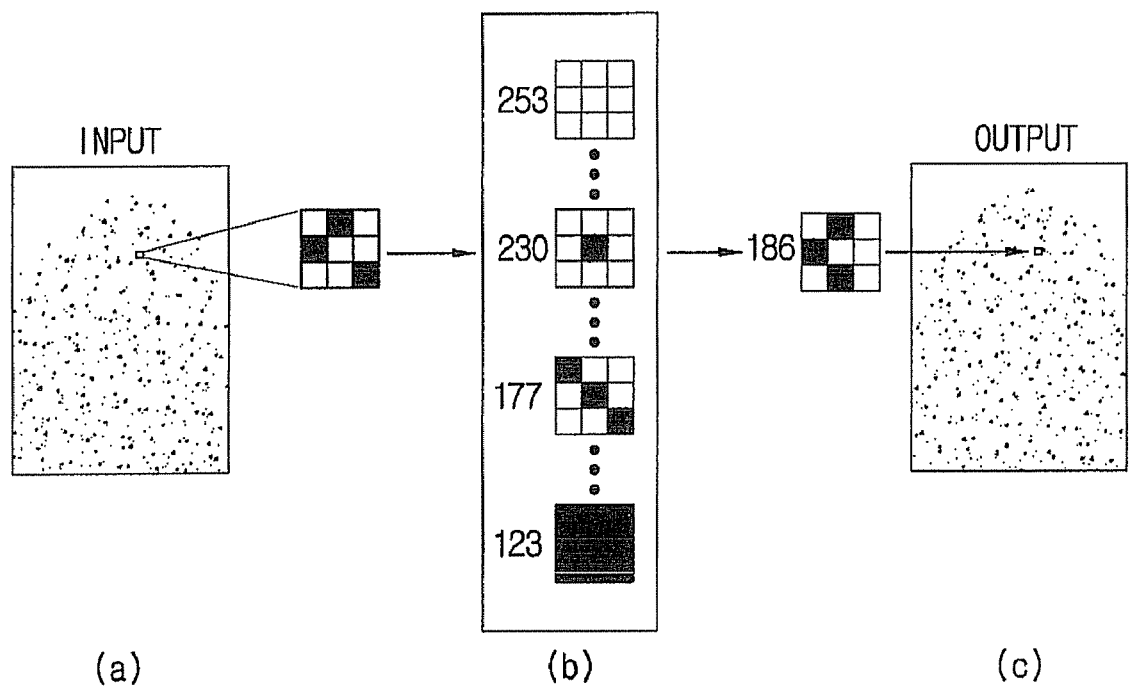
FIG. 3 is a view explaining the operation of changing halftoned print data according to an example embodiment of the present invention.

FIG. 3 is a view explaining the operation of changing the halftoned print data. FIG. 3(a) exemplifies the print data halftoned by the halftoning unit 110 and illustrates an enlarged data area obtained when the data area dividing unit divides the halftoned print data. In FIG. 3(a), three dots are disposed in one data area of the halftoned print data. FIG. 3(b) exemplifies a part of the plurality of dot patterns stored in the storage unit 130. Each dot pattern has an index value in order to be easily distinguished and searched.

The pattern extraction unit 150 extracts a dot pattern suitable for the data area divided by the data area dividing unit 140. From the plurality of dot patterns, a dot pattern with an index value of 186 is extracted as illustrated in FIG. 3(b).

The data area illustrated in FIG. 3(a) has three dots. When comparing the data area to a dot pattern extracted from the plurality of dot patterns in FIG. 3(b), two dots are disposed at the same position and the single remaining dot is disposed at a different position. The single remaining dot in the data area and the dot pattern are in adjacent locations.

Since the dot pattern with an index value of 186 extracted in the pattern extraction unit 150 illustrated in FIG. 3(b) is, of the dot patterns stored in the storage unit 130, the dot pattern most similar to the data areas illustrated in FIG. 3(a), the pattern extraction unit 150 extracts the dot pattern with the index value of 186.

FIG. 3(c) illustrates an example of matching the extracted dot pattern with an index value of 186 illustrated in FIG. 3(b) to the halftoned print data of FIG. 3(a) by the pattern converter 160. Only one data area is exemplified and described herein; however, if the dot patterns are matched to all the data areas of the halftoned print data shown in FIG. 3(a), the halftoned print data becomes new print data optimized for the print characteristics of the print engine.

Figure 4A:
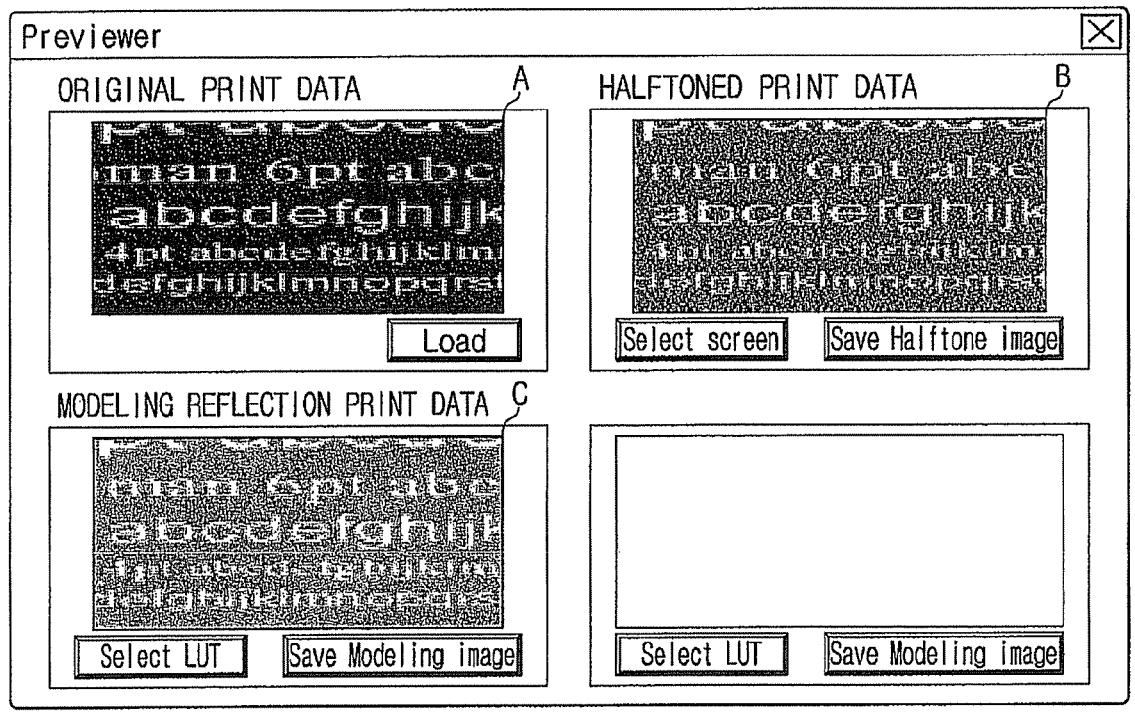
FIGS. 4A and 4B are views showing the result of the operation in FIG. 3.
Figure 4B:
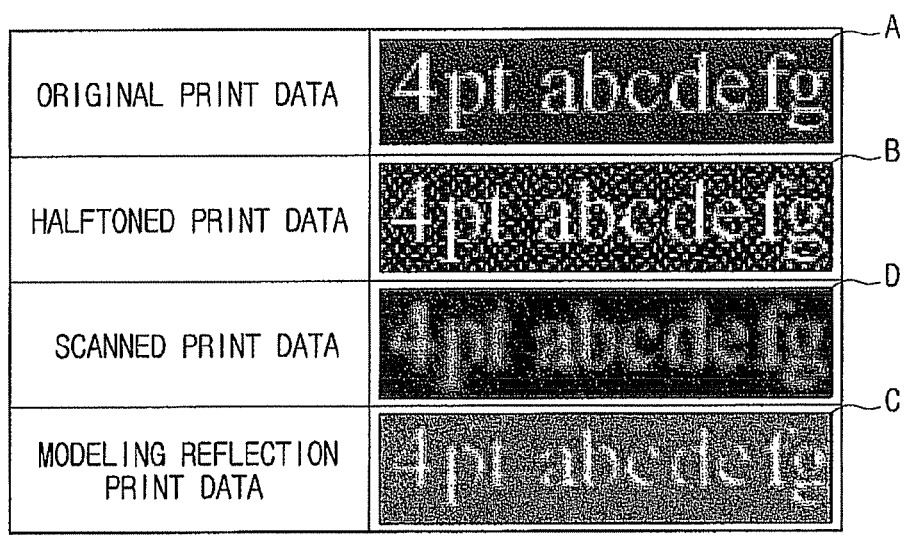

FIGS. 4A and 4B are views showing the result of the operation in FIG. 3. FIG. 4A shows the result of changing the halftoned print data to an appropriate dot pattern extracted from the plurality of dot patterns through the operation of changing the halftoned print data, as illustrated in FIG. 3, and, for comparison, the halftoned print data according to the conventional method.

Halftoned print data B is the result of halftoning the original print data A according to the conventional method. Modeling reflection print data C is the result of dividing the halftoned print data B into data areas in the data area dividing unit 140, extracting each dot pattern corresponding to the divided data areas, and changing each data area to the extracted dot patterns. In this case, the modeling technique is reflected in the dot pattern generated in the dot pattern generator 120 and, accordingly, new print data generated by the pattern converter 160 is referred to as the modeling reflection print data C. As illustrated in FIG. 4A, the modeling reflection print data C, which takes into account print characteristics of the print engine, has a higher quality than the halftoned print data B obtained through the conventional method.

FIG. 4B illustrates another example of the original print data A and the halftoned print data B in the same manner as in FIG. 4A, except that scanned print data D obtained by scanning the halftoned print data B is illustrated as well. When comparing the halftoned print data B, scanned print data D, and modeling reflection print data C shown in FIG. 4B, it is apparent that the modeling reflection print data C has a higher quality than both the halftoned print data B and the scanned print data D.

Figure 5:
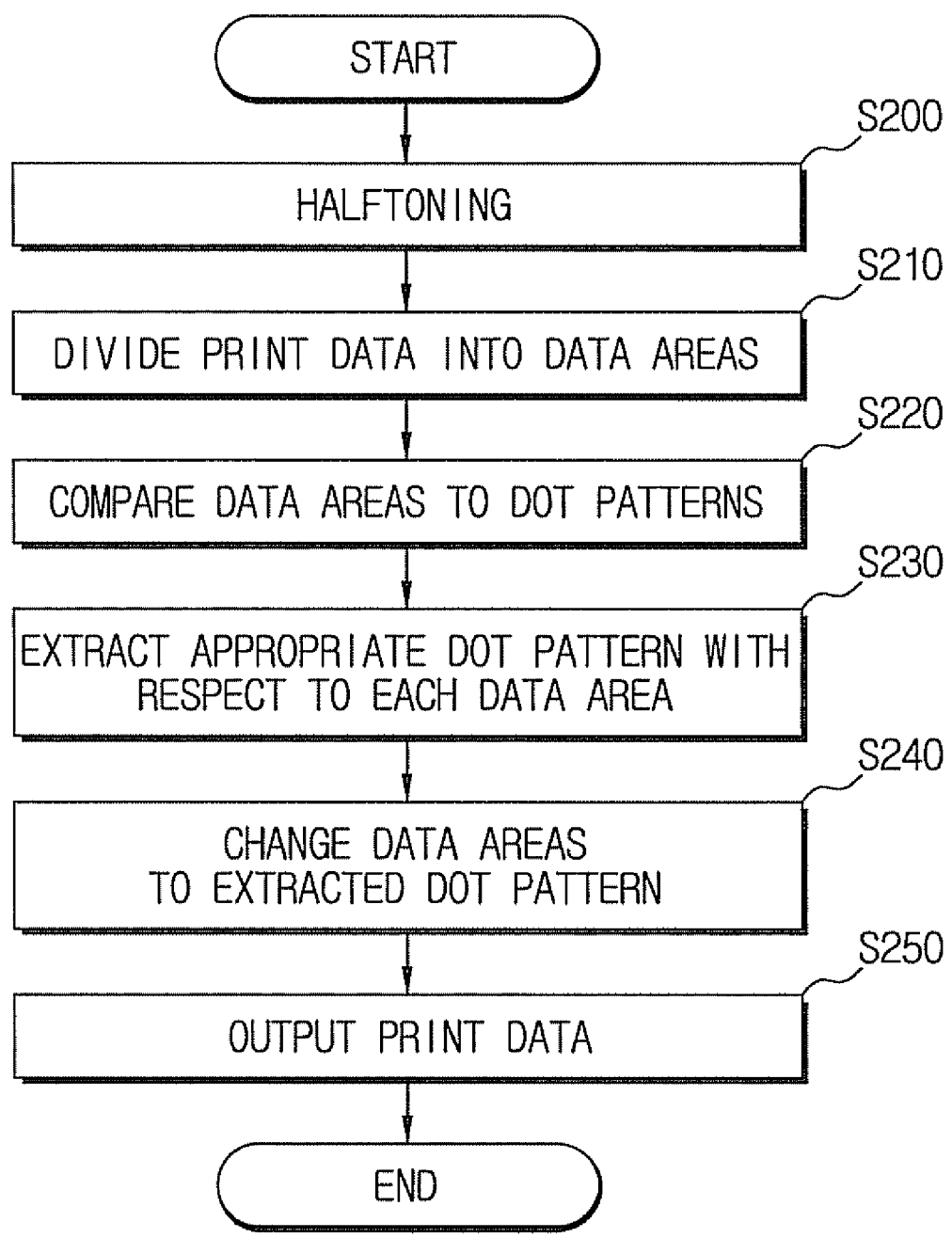
FIG. 5 is a flowchart explaining a halftoning correction method of an electrophotographic image forming apparatus according to an example embodiment of the present invention.

FIG. 5 is a flowchart explaining a halftoning correction technique of an electrophotographic image forming apparatus according to an example embodiment of the present invention. Although the description of the technique refers to particular operations being taken by particular units of an image forming apparatus, other embodiments may perform the operations using different units.

When the print data is received, the halftoning unit 110 halftones the original print data A, obtaining halftoned print data B, as exemplified in FIGS. 4A and 4B, at block S200. The data area dividing unit 140 divides the halftoned print data B generated in the halftoning unit 110 into data areas of the same size (3×3) as the dot patterns stored in the storage unit 130 at block S210.

The pattern extraction unit 150 compares the data areas divided by the data area dividing unit 140 to corresponding dot patterns stored in the storage unit 130 having the same number of dots as in the data areas at block S220. At block S230, the pattern extraction unit 150 then extracts an appropriate dot pattern, which may be matched to each data area, from dot patterns having the same number of dots as in the data areas according to the comparison result obtained in block S220.

The pattern converter 160 changes the data areas obtained at block S210 to the corresponding dot patterns extracted at block S230. Accordingly, the pattern converter 160 converts the halftoned print data B to the modeling reflection print data C at block S240.

At block S250, the print engine 170 prints the modeling reflection print data C obtained in block S240. The printed output outputted by the operations described above can have a higher quality than in the situation in which only halftoning by the conventional method is performed.

As described above, according to the example embodiments of the present invention, the electrophotographic image forming apparatus and the halftoning correction technique thereof compensate for the halftoned print data using a plurality of dot patterns generated taking into consideration print characteristics of the print engine. Therefore, an optimal halftoning result can be obtained, considering the characteristics of the hardware.

The process described herein may be recorded in computer-readable media including program instructions to implement various operations. The media may also include, alone or in combination with the program instructions, data files, data structures, and the like. Examples of computer-readable media include magnetic media, such as hard disks, floppy disks, and magnetic tape; optical media such as CD ROM disks and DVD; magneto-optical media, such as optical disks; and hardware devices specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the image forming apparatus may be any apparatus to form images on printable media, such as a printer, a photocopier, a facsimile machine, or a multifunctional product. Similarly, the image forming apparatus may form images on any printable media, such as paper, facsimile paper, or transparent film. Accordingly, it is intended, therefore, that the present invention not be limited to the various example embodiments disclosed, but that the present invention includes all embodiments falling within the scope of the appended claims.

What is claimed is:

1. An electrophotographic image forming apparatus having a print engine to form an image onto a printable medium, the apparatus comprising:
    a storage unit to store a plurality of dot patterns representing print characteristics of the print engine;
    a data area dividing unit to divide halftoned print data, obtained from image data to be printed on the printable medium, into data areas having the same size as the dot patterns;
    a pattern extraction unit to extract an appropriate dot pattern from the storage unit with respect to each of the data areas by comparing dots in the data areas to the dot patterns; and
    a pattern converter to convert the data areas to the appropriate dot pattern,
    wherein the pattern extraction unit extracts a dot pattern identical to the data area, and
    the pattern extraction unit extracts a dot pattern in which the dots are disposed at a position adjacent to dots in the data area, when there is no dot pattern in which the dots are disposed at the same position as in the data area.

2. The apparatus according to claim 1, further comprising a dot pattern generator to change the position of a predetermined number of dots in a dot pattern of a certain size and to generate the plurality of dot patterns taking into consideration the print characteristics of the print engine.

3. The apparatus according to claim 2, wherein the dot pattern generator outputs a test image, scans the outputted image, and analyzes the scanned image to determine the print characteristics of the print engine.

4. The apparatus according to claim 1, further comprising:
    a controller to control the operations of the storage unit, the data area dividing unit, the pattern extraction unit, and the pattern converter.

5. The apparatus according to claim 1, further comprising:
    a print engine to output final print data comprising the converted data areas for printing on the printable medium.

6. The apparatus according to claim 1, further comprising:
    a halftoning unit to receive image data and to halftone the image data to create halftoned image data.

7. A halftoning correction method for an electrophotographic image forming apparatus having a print engine to form an image onto a printable medium, the method comprising:
    storing a plurality of dot patterns representing print characteristics of the print engine;
    dividing halftoned print data, obtained from image data to be printed onto the printable medium, into data areas having the same size as the dot patterns;
    extracting an appropriate dot pattern from the stored dot patterns with respect to each of the divided data areas by comparing dots in the data areas to the dot patterns; and
    converting the data area to the appropriate dot pattern,
    wherein the extracting the dot pattern comprises extracting a dot pattern identical to the data areas, and
    the extracting the dot pattern comprises extracting a dot pattern in which the dots are disposed at a position adjacent to dots in the data areas, when there is no dot pattern in which the dots are disposed at the same position as in the data areas.

8. The method according to claim 7, further comprising changing the position of a predetermined number of dots in a dot pattern of a certain size to generate a plurality of dot patterns taking into consideration the print characteristics of the print engine.

9. The method according to claim 8, wherein the generating the dot patterns comprise:
    outputting a test image;
    scanning the outputted image; and
    analyzing the scanned image to determine the print characteristics of the print engine.

10. A non-transitory computer readable medium having stored thereon a plurality of instructions which, when executed by a processor of an image forming apparatus having a print engine to form an image onto a printable medium, cause the processor to perform the steps of:
    storing a plurality of dot patterns representing print characteristics of the print engine;
    dividing halftoned print data, obtained from image data to be formed onto the printable medium, into data areas having the same size as the dot patterns;
    extracting an appropriate dot pattern from the plurality of stored dot patterns for each data area, by comparing dots in the data areas to the dot patterns;
    converting a data area to the appropriate dot pattern; and
    outputting final print data comprising the converted data areas for printing onto the printable medium,
    wherein the extracting the dot pattern comprises extracting a dot pattern identical to the data areas, and
    the extracting the dot pattern comprises extracting a dot pattern in which the dots are disposed at a position adjacent to dots in the data areas, when there is no dot pattern in which the dots are disposed at the same position as in the data areas.

11. The non-transitory computer readable medium according to claim 10, further comprising instructions to cause the processor to perform the steps of:
changing the position of a predetermined number of dots in a dot pattern of a certain size to generate a plurality of dot patterns taking into consideration the print characteristics of the print engine.

12. The non-transitory computer readable medium according to claim 11, wherein the generating the dot patterns comprises:
outputting a test image;
scanning the outputted image;
analyzing the scanned image to determine the print characteristics of the print engine.

* * * * *